C. R. RAWDON AND J. H. HEITMANN.
INNER TUBE FOR PNEUMATIC TIRES.
APPLICATION FILED JULY 3, 1918.
1,305,622.
Patented June 3, 1919.
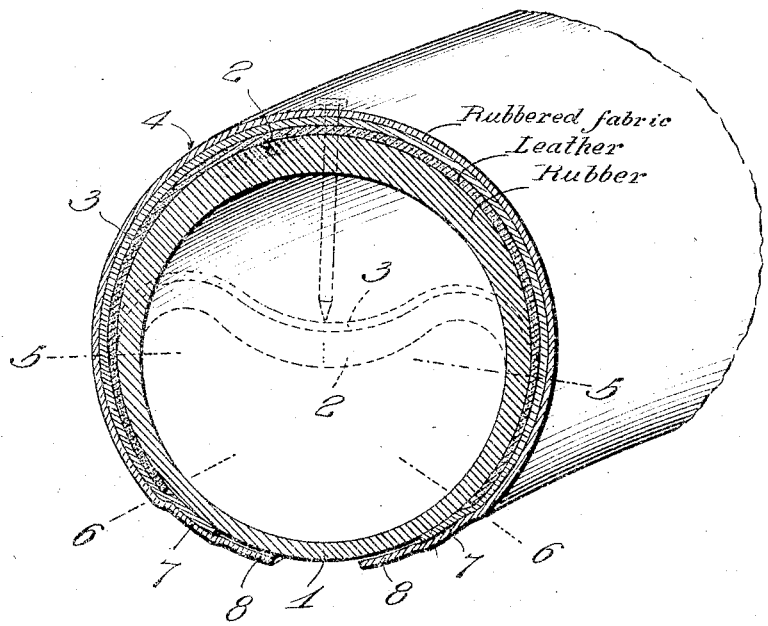
Witness
Inventors
Charles R. Rawdon
John H. Heitmann
Attorneys

UNITED STATES PATENT OFFICE.

CHARLES R. RAWDON AND JOHN HENRY HEITMANN, OF ST. LOUIS, MISSOURI.

INNER TUBE FOR PNEUMATIC TIRES.

1,305,622.   Specification of Letters Patent.   Patented June 3, 1919.

Application filed July 3, 1918. Serial No. 343,160.

*To all whom it may concern:*

Be it known that we, CHARLES R. RAWDON and JOHN HENRY HEITMANN, citizens of the United States, residing in the city of St. Louis and State of Missouri, have invented certain new and useful Improvements in Inner Tubes for Pneumatic Tires; and we do declare the following to be a full, clear, and exact description of the invention, such as will enable others skilled in the art to which it appertains to make and use the same.

Our invention has for its object to provide a comparatively simple and inexpensive, yet a highly efficient and reliable inner tube for automobile and other pneumatic tires, so constructed as to be practically immune to puncture; and with this object in view, the invention resides in the novel construction herein described and claimed, reference being made to the accompanying drawing in which a sectional perspective view of the tube is shown.

On the illustration, the numeral 1 designates a dilatable tube preferably formed of one piece of rubber thickened slightly at its tread as seen at 2, it being understood however that the thickened tread portion is not essential, although desirable. Permanently cemented upon the outer side of the dilatable tube 2, is a layer 3 of chrome leather or other puncture resisting material, said layer extending over the tread portion of the tube and along opposite sides thereof as shown. A covering 4 formed of a suitable number of rubbered fabric plies, extends over the puncture resisting layer 3 and is cemented to the edge portions of the latter substantially between the lines 5 and 6. The covering 4 projects beyond the edges of the layer 3 as seen at 7 and is vulcanized to the rubber tube 1, said covering terminating in flaps 8 which are loose from the rim portion of the tube. Between the lines 5, or in other words over the entire rim portion of the tube, the covering 4 is loose from the layer of leather or the like 3, and by this arrangement, whenever a sharp object such as a nail penetrates the outer casing, it will pass through the covering, but when the material 3 is encountered, the tube 1 and said material will be flexed inwardly to the position shown in dotted lines, thus preventing puncture until the nail or the like can be withdrawn.

From the foregoing, taken in connection with the accompanying drawing, it will be obvious that although our invention is of simple and inexpensive nature, it will be highly efficient and reliable, being approximately puncture proof. Since probably the best results are obtained from the exact construction shown and described, it is preferably followed, but within the scope of the invention as claimed, considerable latitude is allowed for making such changes as occasion may dictate.

We claim:

1. An inner tube for pneumatic tires comprising a one-piece dilatable air tube, a layer of pliable puncture resisting non-stretching material covering the tread portion and sides of said tube with its edges disposed adjacent the rim engaging portion of the tube, a protecting covering of non-stretching material extending over said puncture resisting layer and loose therefrom over the tread and sides of the tube, the edges of said covering being secured to said air tube along the edges of said layer, and the rim engaging portion of said air tube being exposed and free to stretch between said secured edges of said covering.

2. A structure as specified in claim 1, said protecting covering having flaps on its secured edges loose from said rim engaging portion of said air tube and disposed for contact therewith.

3. An inner tube for pneumatic tires comprising a one-piece rubber air-tube, a layer of non-stretching puncture resisting material permanently secured to the tread portion and sides of said air tube with its edges disposed adjacent the rim engaging portion of the latter, and a covering of rubbered fabric extending over said layer and beyond the edges thereof, said covering being secured to the edges of said layer and being vulcanized to said air tube along the edges of said layer, the tread and side portions of said covering being loose upon said layer and the edges of said covering extending beyond its vulcanized portions to form flaps loose from said rim engaging portion of the air tube but disposed for contact therewith, said rim engaging portion of the air tube being exposed and free to stretch between said vulcanized portions of the covering.

In testimony whereof we have hereunto set our hands.

CHARLES R. RAWDON.
JOHN HENRY HEITMANN.